(12) United States Patent
Biribauer et al.

(10) Patent No.: US 7,443,129 B2
(45) Date of Patent: Oct. 28, 2008

(54) QUENCHING DEVICE FOR A CONVERTER BRIDGE WITH LINE REGENERATION

(75) Inventors: Thomas Biribauer, Vienna (AT); Franz Hackl, Vienna (AT); Wilfried Hofmüller, Stockerau (AT); Heinz Pichorner, Pettendorf (AT); Wilhelm Ritschel, Vienna (AT); Franz Wöhrer, Vienna (AT)

(73) Assignee: Siemens Österreich, Vienna (AT)

( * ) Notice: Subject to any disclaimer, the term of this patent is extended or adjusted under 35 U.S.C. 154(b) by 60 days.

(21) Appl. No.: 11/632,523

(22) PCT Filed: Jul. 11, 2005

(86) PCT No.: PCT/EP2005/007493

§ 371 (c)(1),
(2), (4) Date: Jan. 16, 2007

(87) PCT Pub. No.: WO2006/005564

PCT Pub. Date: Jan. 19, 2006

(65) Prior Publication Data

US 2008/0037960 A1    Feb. 14, 2008

(30) Foreign Application Priority Data

Jul. 14, 2004    (AT) ............................. A 1198/2004

(51) Int. Cl.
*H02P 7/42*        (2006.01)
*H02M 7/00*       (2006.01)

(52) U.S. Cl. ..................... 318/801; 318/800; 318/809; 318/811; 363/40; 363/71; 363/65.12; 363/165

(58) Field of Classification Search ......... 318/800–812; 363/40, 71, 165, 65.12
See application file for complete search history.

(56) References Cited

U.S. PATENT DOCUMENTS

| | | | | |
|---|---|---|---|---|
| 4,019,116 | A | * 4/1977 | Klautschek | 363/138 |
| 4,449,087 | A | 5/1984 | Lippitt et al. | |
| 4,777,581 | A | 10/1988 | Smith | |
| 5,527,742 | A | * 6/1996 | Weiler et al. | 438/123 |
| 6,057,664 | A | * 5/2000 | Ikawa et al. | 318/811 |
| 6,344,725 | B2 | * 2/2002 | Kaitani et al. | 318/700 |
| 6,737,828 | B2 | * 5/2004 | Kiuchi et al. | 318/779 |
| 6,788,024 | B2 | * 9/2004 | Kaneko et al. | 318/807 |
| 6,922,990 | B2 | * 8/2005 | Naruse et al. | 60/414 |

(Continued)

FOREIGN PATENT DOCUMENTS

AT            404 414 B      9/1998

(Continued)

*Primary Examiner*—Paul Ip (57) ABSTRACT

There is described a method for controlling a quenching device for a converter bridge with line regeneration, whereby the converter bridge controlled by a network-timed control circuit by ignition pulses is connected with its three inputs to the phases of a three-phase network and the two outputs of the bridge are connected to a direct-current motor which feeds, when operated as a generator, current back to the three-phase network via the bridge. The quenching device is controlled by a trigger unit which emits trigger pulses depending on the monitoring of electrical and temporary variables. The device has measuring values "direct output current" and/or "supply voltages" used to determine characteristic values which are compared with theoretical characteristic values. Depending on the result of said comparison, the quenching device is optionally activated.

18 Claims, 4 Drawing Sheets

U.S. PATENT DOCUMENTS

| | | | |
|---|---|---|---|
| 7,042,178 B2 * | 5/2006 | Yamada et al. | 318/376 |
| 7,053,587 B2 * | 5/2006 | Ito et al. | 318/801 |
| 7,112,931 B2 * | 9/2006 | Kitajima | 318/114 |
| 7,301,789 B2 * | 11/2007 | Wiseman | 363/56.12 |
| 7,304,452 B2 * | 12/2007 | Nagai et al. | 318/811 |
| 7,362,597 B2 * | 4/2008 | Ishikawa et al. | 363/71 |

FOREIGN PATENT DOCUMENTS

| | | |
|---|---|---|
| DE | 26 42 412 B1 | 1/1978 |
| DE | 41 36 730 A1 | 5/1993 |
| EP | 0 802 602 A2 | 10/1997 |
| SU | 556 691 A | 11/1977 |
| SU | 1 005 252 A | 3/1983 |

* cited by examiner

QUENCHING DEVICE FOR A CONVERTER BRIDGE WITH LINE REGENERATION

CROSS REFERENCE TO RELATED APPLICATIONS

This application is the US National Stage of International Application No. PCT/EP2005/007493, filed Jul. 11, 2003 and claims the benefit thereof. The International Application claims the benefits of Austrian application No. A 1198/2004 filed Jul. 14, 2004, both of the applications are incorporated by reference herein in their entirety.

FIELD OF INVENTION

The invention relates to a method for controlling a quenching device for a converter bridge with line regeneration, whereby the converter bridge controlled by a network-timed control circuit by ignition pulses is connected with its three inputs to the phases of a three-phase network and the two outputs of the bridge are connected to a direct current motor, which feeds, when operated as a generator, current back to the three-phase network, and the quenching device is controlled by a trigger unit which emits trigger pulses depending on the monitoring of electrical and temporary variables.

The invention also relates to a corresponding quenching device.

BACKGROUND OF INVENTION

With line-commutated converters, as are described for example in AT 404 414 B written by the applicant, faults in the voltage or current waveform, especially overvoltages and/or commutation errors, lead to a destruction of the expensive thyristors or switches of such a bridge.

In more precise terms the basic problem which arises with said line-commutated converters is that of shoot-through which occurs in feedback operation. In such cases an overcurrent arises on power outage and sufficient dc voltage, e.g. a corresponding armature voltage of the motor, which further increases and is also no longer able to be quenched by the converter itself. The inevitable result is then a triggering of fuses which are generally provided and are intended to protect the thyristors. The consequence is a longer downtime of the converter and of the motor fed by it since an appropriate period of time is required to replace the fuses which are usually embodied as fast semiconductor fuses. Efforts were thus made to create various, sometimes complex devices, to limit and to interrupt the overcurrent or to either prevent a shoot-through or to end it in a controlled manner, such as in the above-mentioned patent of the applicant for example.

Fast direct current switches are known for example which lie in the direct current path. If their secure function is to be guaranteed, additional highly-controllable chokes are necessary to restrict the rise in the current and the costs are accordingly considerable, quite apart from the problematic dimensioning and regular maintenance required for secure operation.

Other methods for direct thyristor quenching with quenching capacitors are also known, for example the quenching of only one of the two halves of the converter bridge with a capacitor, whereby the motor current still fully loads the valves of the second half of the bridge until the motor current is completely reduced to zero and thereby protection is not possible in all cases. A similar method is the quenching of both bridge halves with two capacitors and with a voltage limitation in parallel to this in each case, which however allows overvoltages at the motor. In addition the stated methods do not protect against an overvoltage in the event of a power outage if there is a transformer between network and converter bridge.

SUMMARY OF INVENTION

One object of the invention lies in specifying a method for control of a quenching device, with which the thyristors of a converter with line regeneration can be quenched so quickly that the upstream semiconductor fuses of the thyristors individually or the converter as a whole, especially in the case of a shoot-through, are protected before they melt or are damaged (ageing). Where fuses are present, the melting integral ($I^2t$) should not be reached, with fuseless operation the limit load integral ($I^2t$) of the thyristors may not be reached. In addition the converter should be protected from overvoltages, especially such as occur with power outages, above all for operation with a transformer, and which are often the cause of commutation errors and result in the destruction of the thyristors.

These objects are achieved by a method mentioned at the start in that, in accordance with the invention, the waveforms of at least two phases of the three-phase network are measured over a predeterminable range of the phase angle as a function of the phase angle, a characteristic value is determined from the waveform of the two phases as a function of the phase angle, the determined characteristic value is compared with a corresponding, theoretical characteristic value, and if the characteristic value determined from the measured values of the phases deviates by a predeterminable value from the theoretical characteristic value, the quenching device is activated.

As an alternative or in addition, said objects are achieved with a method mentioned at the start in that, in accordance with the invention, the motor direct output current is determined as a function of the time, the second derivation of the direct output current is formed according to the time, and for the case in which the second derivation assumes a value equal to or greater than zero in an area between two consecutive trigger points, the quenching device is activated.

In this way, solely by determining process variables ("output direct current", "three-phase voltage"), which are required in any event for the normal function of the converter, criteria are derived on the basis of which the quenching device is activated. Determination of these criteria is thus relatively simple to arrange and leads to a reliable control of the quenching device.

BRIEF DESCRIPTION OF THE DRAWINGS

Advantageous embodiments and developments of the invention are explained in the subclaims and will be explained in greater detail within the context of a description of the Figures.

The invention is explained in greater detail below with reference to the drawing. The Figures show FIG. 1 in a schematic block diagram, a converter bridge triggered by a control circuit for supplying a direct current motor together with a quenching device with an associated trigger device, FIGS. 2a and 2b schematic diagrams of the three-phase network waveforms in conjunction with a first embodiment of the invention, and FIG. 3 a current graph with a further alternative or additional embodiment of the invention.

DETAILED DESCRIPTION OF INVENTION

Figure 1:
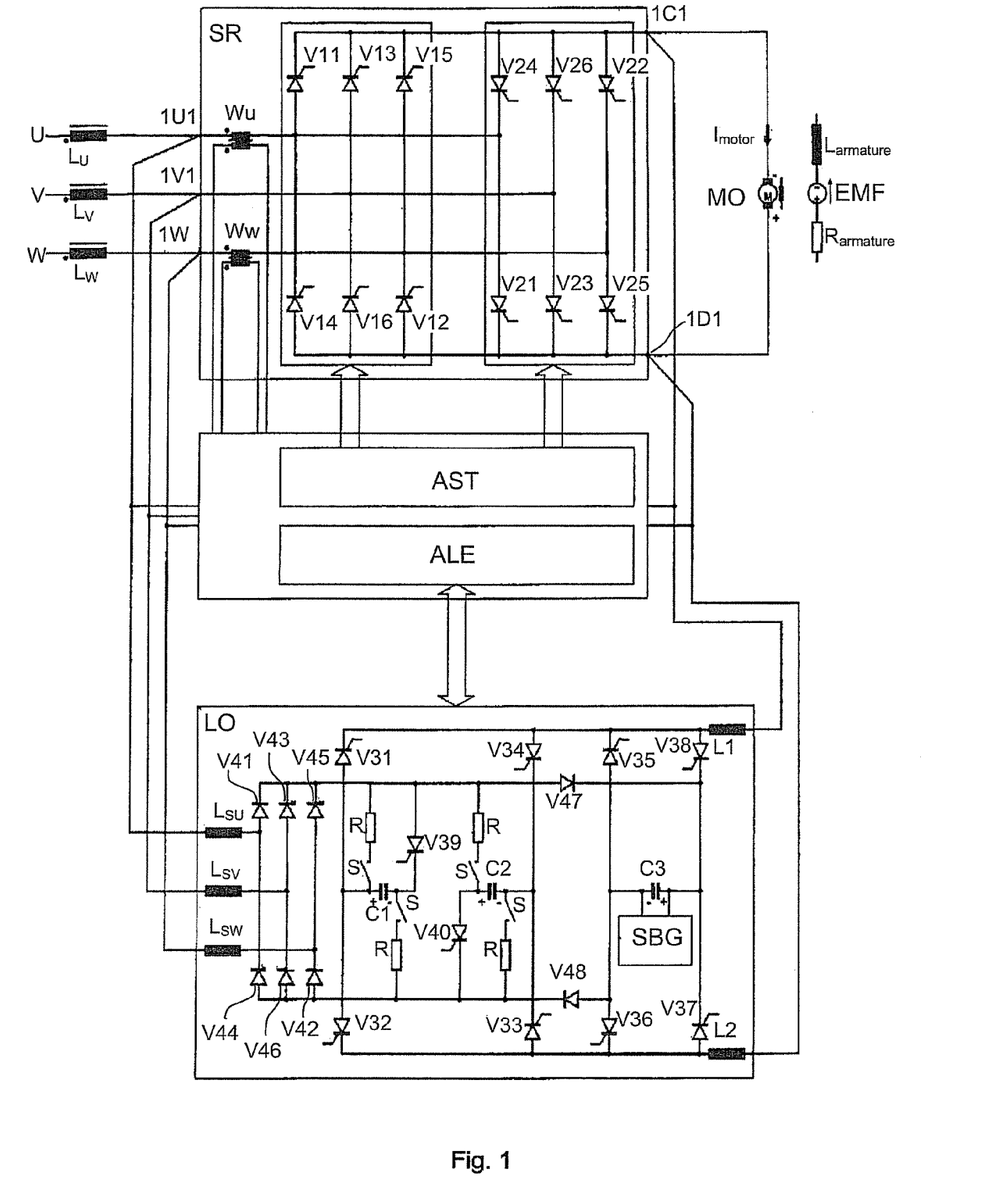

For a better understanding of the invention, FIG. 1 first shows a converter bridge triggered by a control circuit for supplying a direct current motor along with a typical quenching device with an associated trigger device. Such a quenching device is particularly well suited within the context of the invention, but basically other quenching devices can be used within the framework of the invention, which differ from the quenching device shown in some of their details which are not explained at any greater length here.

As can be seen from FIG. 1, the three phases U, V, W of a three-phase network are connected via commutation chokes Lu, Lv, Lw to the three-phase side of a converter bridge SRB. In this case a network fuse not shown in the drawing usually lies in each phase, as described for example in AT 404 414 B in conjunction with its FIG. 2. The controlled rectifier switches V11, ..., V16 and V21, ..., V26 are embodied as thyristors or comparable components.

A control device AST is provided for both bridges which looks after network-timed ignition of the thyristors. By shifting the ignition times a speed or torque regulation can be undertaken in a known manner. The three-phase voltages of the network and the motor clamping voltage, as well as via two current converters $W_u$, $W_w$ the phase currents are fed to the control circuit so that corresponding information is available for the regulation and the control of the rectifier bridge.

The two direct current terminals 1C1, 1D1 of bridge SRB are routed to a direct current motor MOT which, in generator operation, feeds current via the bridge consisting of the switches V11, ..., V16 back to the three-phase network. It should be noted here that only generator operation (flow of energy into the network) is of interest in conjunction with the invention. The other bridge V21, ..., V26 can also operate in feedback mode if the motor EMC is present reversed (requires reversed direction of rotation). For the sake of simplicity the case will now be examined here in which the bridge consisting of switches V11, ..., V16 is also a bridge with line regeneration. No problem which requires an intervention in the sense of quenching can arise in the actual feeding bridge, regardless of which one this currently is. In concrete terms, if there is a power outage in a feeding bridge the current falls. For further understanding it should be remembered that the equivalent circuit can be shown as a series circuit of the motor EMC, the armature inductance $L_{anker}$ and the armature resistance $I_{anker}$. The output current of the bridge SRB corresponds to the motor current $I_{anker}$ shown in the drawing.

The quenching device LOV embodied and acting as a typical device in the sense of invention possesses a quenching capacitor C1 or C2 for each bridge half V11, V13, V15 or V14, V16, V12 (with reversed EMC for V21, V23, V25 or V24, V26, V22) of which each capacitor, as is still to be described below, is charged to the polarity shown in the drawing. The plus pole or the minus pole of the capacitors C1 and C2 is connected in the manner shown via thyristors V31, V32 and V34, V33 to the direct current connections 1C1 and 1D1 of the converter bridge SRB, in the present case via commutation chokes L1, L2. The minus pole of C1 or the plus pole of C2 is connected via a thyristor V39 and three diodes V41, V43, V45 or via a thyristor V40 and three diodes V44, V46, V42 to the alternating current connections 1U1, 1V1, 1W1 of the converter bridge SRB. Chokes $L_{SU}$, $L_{SV}$, $L_{SW}$ shown in the drawing in the connections limit the current increase, these can be air coils or parasitic (line) inductances.

The quenching device shown also features a protective capacitor C3 to which a voltage limiter SBG is connected in parallel. The minus pole of the protective capacitor C3 is connected via the thyristors V35, V36 and the plus pole via the thyristors V38, V37 to the direct current terminals 1C1, 1D1 of the bridge SRB. It should be noted that—by contrast with the quenching capacitors C1, C2—the protective capacitor C3 always has a voltage of the same polarity applied to it and that the thyristors V35, ..., V38 can also be replaced by diodes, if the sum of the charge voltages of C1 and C2 is smaller than the off voltage of C3.

The direct current side of the diodes V41, ..., V46 arranged in a bridge circuit is connected via diodes V47 or V48 to the input of the voltage limiter SBG and to the protective capacitor C3. Within the course of the quenching process they make it possible to reduce the current in the commutation chokes on the one hand and in a normal operation of the converter bridges (motor and generator) the transfer of transient overvoltages from the network and of commutation voltage peaks from the converter itself.

The quenching process (for the polarity of the motor EMC shown in the drawing) will now first be explained below, in which case quenching capacitors C1, C2 charged in accordance with the drawing are a prerequisite. Their charging will be explained further below.

On ignition of the quenching thyristors, V33 and V39, V40 by the trigger unit ALE the currents commutate both from the upper half bridge V11, V13, V15 into the capacitor C1, and also from the lower half bridge V14, V16, V12 into the capacitor C2, whereby all currents in the line regeneration converter V11, ..., V16 are immediately quenched. Simultaneously with the emission of the quenching pulses (ignition pulses for the quenching thyristors) the ignition pulses for the bridge SRB are also blocked.

The voltages at the capacitors C1, C2 oscillate through the motor current until the latter commutates via the thyristors V35 and V37 ignited shortly beforehand in the capacitor C3 present at the voltage limiter SBG. If the voltage at C3 has not yet reached the limiting level of the limiter SGB it is charged up to this by the motor current. It should be noted here that currents only flow through the thyristors V32, V34, V36 and V38 with reversed motor EMC.

The voltage limiter SBG and its function are discussed in greater detail below, in which case a requirement is that the polarity of the motor voltage (voltage at motor or device terminals) is reversed briefly, for around 11 ms, by the quenching process. Once the original motor voltage is reached again the motor current has increased slightly in relation to its initial value at the quenching point. The current in the armature inductance of the motor is only reduced to zero by a higher voltage and this voltage must be controlled by the voltage limiter SBG in the sense of a limitation to a maximum value.

The limitation is undertaken in a known manner by a controlled triggering of ballast resistors at the input terminals of the limiter SBG and thus at the protective capacitor C3. The ballast resistors are connected in a different clock pulse depending on the voltage level, with electrical energy being converted into heat energy. De facto a two-state controller is available with around 10% hysteresis which switches the ballast resistors on and off. To make a higher sum quenching voltage possible the voltage limiter SBG can only be switched off during the synchronization of the capacitors C1, C2 via the thyristors V35, ..., V38. Four diodes could also be used here but since these necessarily form a bridge converter with C3 the said sum quenching voltage during the initial rectification would exceed the value of the instantaneous voltage of C3 and would cause a significant (unrestricted/damaging current surge). Therefore four quenching thyristors are used, which are ignited at around the time of the zero crossing of the capacitor voltages C1 and C2. The there is namely no longer the danger since the motor current, which commutates into the limiter as already-described above, is predetermined (or impressed or quasi constant). The capacitor C3 designated as protection capacitor could also be omitted with use of another limiter SBG, with voltage-dependent resistors or Zener diodes being considered here for example.

The voltage limiter SBG is however permanently connected via the already mentioned diodes V47, V48 to the diode bridge V41, . . . , V46. This makes it possible for all overvoltages coming from the network to also be limited. For example significant overvoltages can occur which an upstream transformer is switched off under load. This is not discussed in any greater detail below.

To avoid permanent leakage power at the said resistors of the voltage limiter SBG, this can feature a further switch with a somewhat lower voltage threshold, at which the clocked ("chopped") resistors or a resistor possess or possesses a significantly higher resistance value than the given values of the voltage limiter.

It should be stated here that in a practical embodiment the chopped resistor effectively processes 250 mOhm. The implementation is undertaken in parallel through four IGBT switches and four resistors each with 1 Ohm. A current of 900 A flows through each resistor on limitation.

The two quenching capacitors C1, C2 must be charged up to a part—typically 0.5 to 0.9—of the peak value of the phase-to-phase ac voltage. The two capacitors C1 and C2 are charged in the reverse order after a quenching process. The circuit described below thus strictly speaking first causes a discharging to zero and only then a charging. The manner in which the two capacitors are charged is of no significance for the principle of invention, however an option for a charging circuit proven in practice, integrated into the overall circuit of the quenching device, is described below. For each capacitor C1 or C2 this features two charge resistors R1, R2 or R3, R4, which lead to the plus pole—R1, R3—or to the minus pole—R2, R4—of the bridge circuit V41 . . . V46. Switches, S1, S2, for C1 and S3, S4 for C2 which lie in series with the charge resistors R, R2 and R3, R4, are controlled by the two-state controller not shown in the drawing. Charging is only possible if the quenching thyristors are switched off. In addition, with this circuit this avoids a duplicate voltage load on the quenching thyristors V31 and V33, or V32 and V34.

When quenching occurs, immediately after the ignition of the quenching thyristors during the synchronization of the voltage at the quenching capacitors C1 and C2, these must be disconnected from the charge circuit by the previously-mentioned semiconductor switches S1 . . . S4 in order to prevent the quenching thyristors remaining conductive after a successful current reduction through the charge current. This would namely prevent a further charge process and the result would be an overloading of the charge resistors R1, . . . , R4. As soon as the capacitors C1 and C2 are sufficiently charged again, a new quenching process can take place, with however the repeat frequency of quenching processes or the number of quenching processes within a specific period being determined by the dimensioning of the circuit, especially of the charge resistors and of the voltage limiter.

The overall circuit can be controlled by an analog circuit with microprocessor support for communication with the converter. The inventive method for a "trigger unit for a thyristor quenching device" will now be discussed in greater detail. The thyristor quenching device is triggered in this case on the basis of measured voltages and currents and/or times which are determined by suitable software for example.

In a first variant of the inventive method the waveforms of at least two phases, in the following the two phases U, V of the alternating current network, are measured as a function of the phase angles φ over a predeterminable area of the phase angle φ. In accordance with the invention, a characteristic value is determined from the waveform of these two phases U, V as a function of the phase angle c, whereby the determined characteristic value $A_{gem}$ is compared with a corresponding, theoretical characteristic value $A_{the}$; The process of determining the theoretical characteristic value is examined further on in this document.

If the characteristic value $A_{gem}$ determined from the measured values of phases U, V deviates by a predeterminable value from theoretical characteristic value, the quenching device LOV is activated. Mathematically this condition can also be formulated as $$A_{gem} < k \cdot A_{the}.$$

This means that the quenching device is activated if the measured characteristic value $A_{gem}$ is smaller by a specific amount than the theoretical characteristic value $A_{the}$.

Figure 2A:
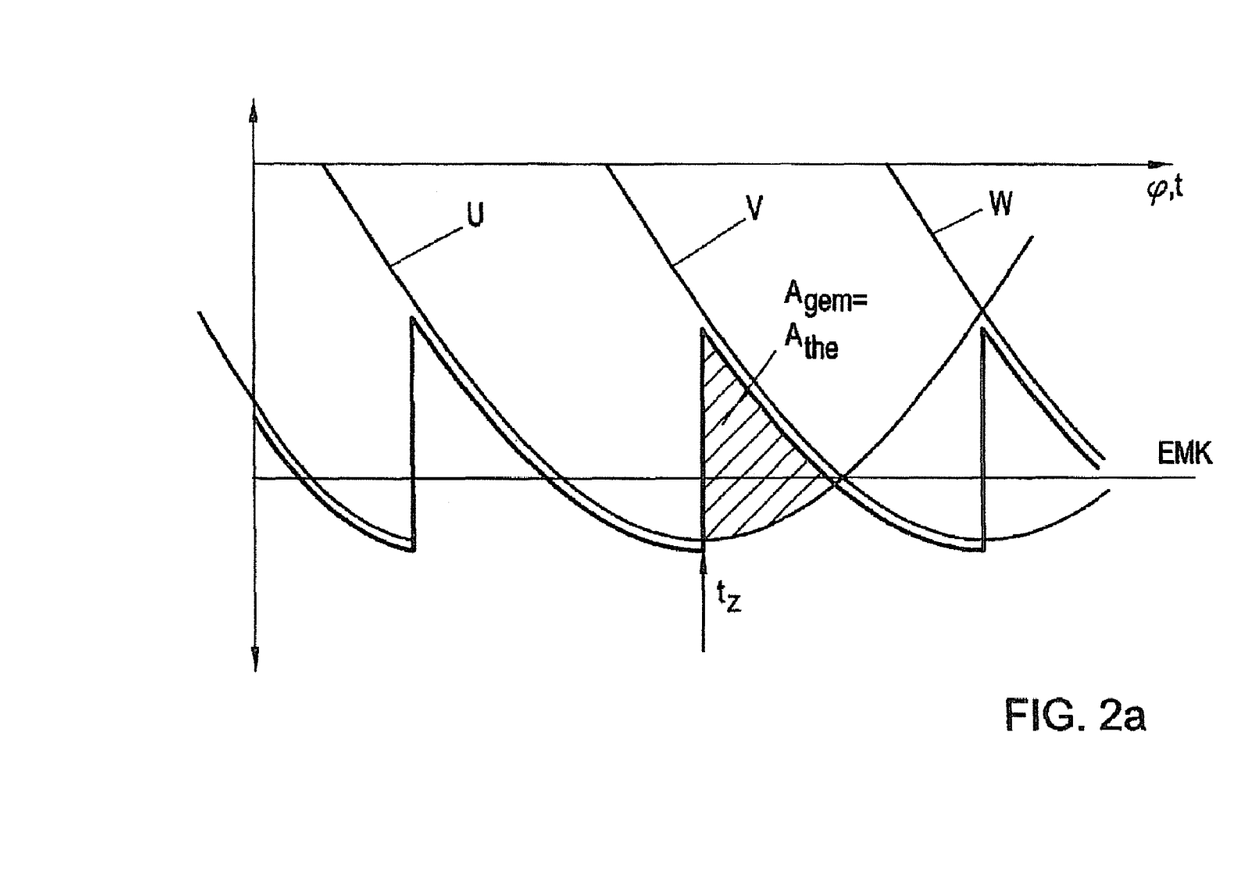
Figure 2B:
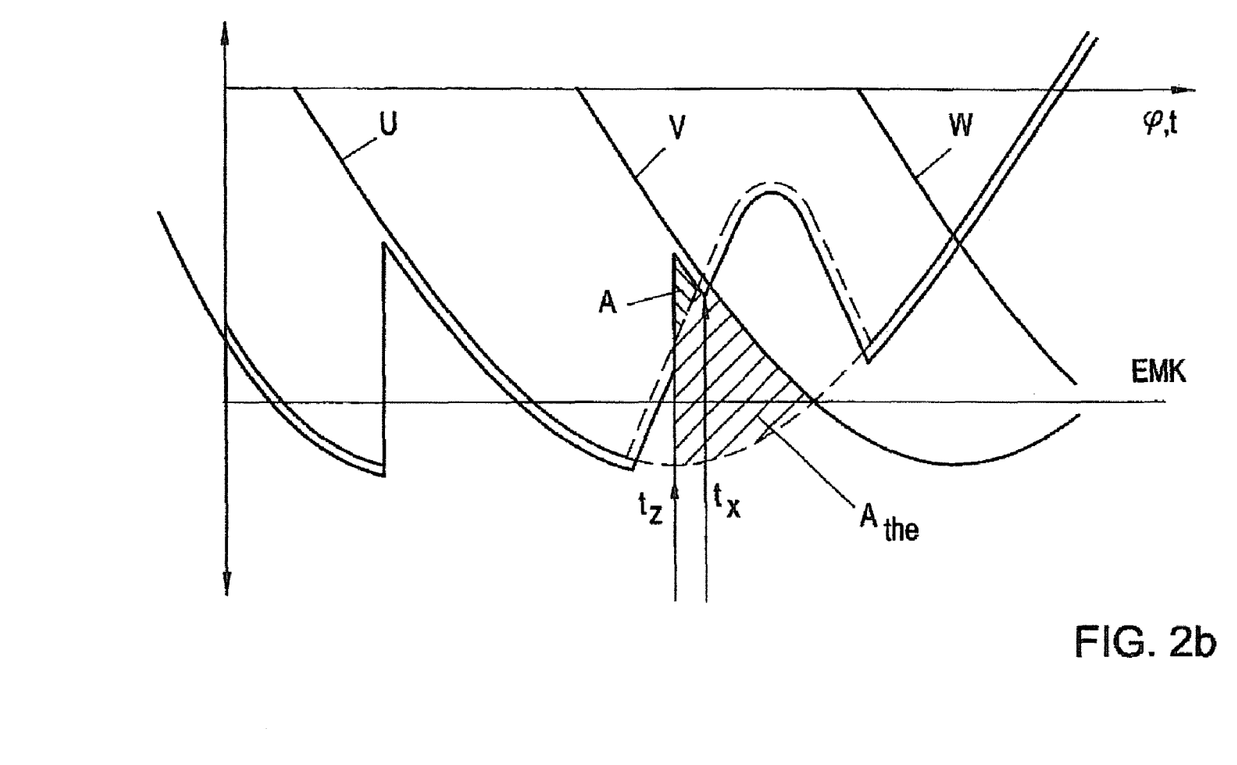

FIGS. 2a and 2b show the actual situation in more detail. FIG. 2a shows the theoretical waveforms of phases U, V, W (ac mains sine wave) by a thick line (slightly offset) showing the resulting theoretical ideal voltage curve at the output of the converter, which would be produced by an orderly commutation. Also shown is the instantaneous EMC of the motor.

This commutation to the next phase, i.e. from phase U to phase V, should have occurred by point in time $t_Z$. In the example shown in FIG. 2b this does not occur since the network voltage exhibits a major interruption in phase U (dashed line), so that, although a change to the new valve (phase V) takes place and current now flows via this phase V, the old valve (Phase U) is not quenched and current is still flowing via this phase. For this reason the abnormal waveform of the voltage at the output of the converter drawn (with a thick line) appears, with the possible resulting detrimental effects.

At point in time $t_X$ the current on phase V cannot fully commute and continues to flow in phase U, since the blocking voltage time area $A_{gem}$ was far too small.

With the first variant of the invention discussed this type of malfunction can be detected in advance and the quenching device LOV can be activated. In concrete terms an area $A_{gem}$, $A_{the}$ is determined with the present variant as characteristic value which is limited by the waveforms of the phases U, V, with the area being calculated between a predeterminable lower phase angle $\phi_{min}$ and a predeterminable upper phase angle $\phi_{max}$.

The characteristic values are thus produced accordingly $$A_{gem,the} = \int_{\varphi_{min}}^{\varphi_{max}} (V - U) d\varphi.$$

Typical useful values are produced if the lower limit of the phase angle $\phi_{min}$ corresponds to the ignition angle φ or ignition end time $t_z$ for an ignition pulse for commutating the first phase U to the second phase V.

An integration usefully takes place only in that area in which V>U applies.

Commutation does not occur for the reason that the area blocking voltage time area $A_{gem}$ is too small since the downwards-commutating thyristor pair needs a minimum blocking voltage time area $A_{gem}$ so that the charge carriers in the thyristors can be removed and the thyristors are capable of blocking. If this minimum area is not available, the transition of a thyristor pair to the next ("commutation") cannot take place. The old thyristor pair remains conductive. Since in this phase however the three-phase voltage goes in the direction of zero and then into the positive, the current in this path will rise quickly and lead to the fusing. If activated at the right time, the quenching device initially deflects the sharply rising current into the quenching capacitor and consequently reduces it to zero.

The upper limit $\phi_{max}$, essentially corresponds to the value of the phase angle in which the first phase U and the second phase V have the same value.

For an ignition angle of $\phi_z=150°$ the blocking voltage area $A_{gem}$ or $A_{the}$ ends 300 after the ignition angle. However it can also be specified generally, i.e. for any given ignition angle, that an upper limit for the phase angle of maximum 30° after the ignition angle $\phi_z$ is sufficient for integration. If, up to this point in time, no sufficient area has yet been produced by comparison with the theoretical blocking voltage area, the commutation has not in any way taken place correctly and the quenching device is activated to prevent an overcurrent becoming established.

As already mentioned the quenching device LOV will be activated if the measured area $A_{gem}$ is smaller by a specific amount than the theoretical area $A_{the}$. The use of the value 0.5 for the above-mentioned factor k has been proven in practice in such cases. Taking this relationship into account an overcurrent can be reliably prevented from becoming established.

Finally it should also be mentioned that to calculate the theoretical area $A_{the}$ for the waveforms of the phases U, V, a cosine or sine wave form is assumed for the phase angle dependency.

To calculate the theoretical area $A_{the}$ the waveforms of two consecutive phases are used, but every 3.3 ms (=⅙ of the network period) 2 other phases will be used, i.e. first U and V, then V and W, then W and U etc.

A further second variant of an inventive method for activating the quenching device makes provision for the motor output direct current $I_A$ (also referred to previously in the description as $I_{motor}$) to be determined as a function of the time, the second derivation of the output direct current $I_A$ to be formed in accordance with the time and for the case in which the second derivation assumes a value equal to or greater than zero in an area between two consecutive ignition times $t_{z1}$, $t_{z2}$; $t_{z2}$, $t_{z3}$; $t_{z3}$, for the quenching device LOV to be activated.

Figure 3:
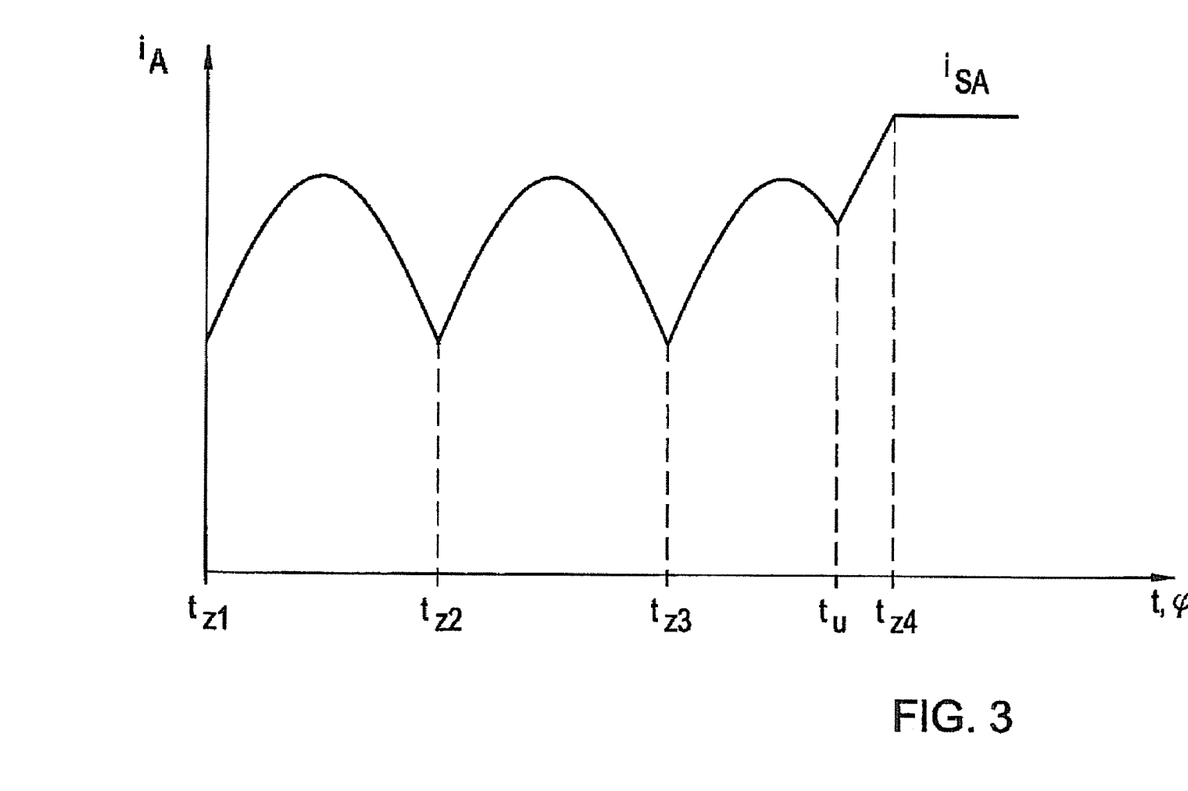

FIG. 3 shows a typical waveform of the motor output direct current $I_A$ as a function of the time t or the phase $\phi$. Between the ignition times $t_{z1}$ and $t_{z2}$ or $t_{z2}$ and $t_{z3}$ the waveform of $I_A$ exhibits a typical waveform, only at the ignition times $t_{z1}$, with I=1, 2, 3 does the waveform changed abruptly; This is normal however since at this point in time a new thyristor pair is ignited. The quenching device is not activated at this point in time.

If however the current waveform exhibits an untypical waveform, such as is the case at point in time tu—at this point in time the waveform changes from $I_A$ as function of the time abruptly, although this time tu lies after the ignition time $t_{z3a}$ but still before the next ignition time—meaning that at this point the converter is not in an orderly state since no new thyristor pair is ignited here. Thus the quenching device is activated at this time.

For each current cup it must thus be the case that $d^2I_A/dt^2<0$. If this is not the case then it must be assumed that as a result of a failure of the three-phase voltage an overcurrent will form within a short time and the quenching device can already be activated before an overcurrent is reached.

Variant 1 and variant 2 are suitable separately for controlling the quenching device, however it is advantageous for both variants to be used simultaneously. Both variants are suitable for activating the quenching device before an overcurrent is reached.

Variant 1 is especially suitable for detecting the establishment of an overcurrent at a point in time around the ignition time, while variant 2 is suitable above all in an area between two ignition times.

In this case with variant 2—regardless of whether it is used together with or independently of variant 1—the output direct current $I_A$ will be measured directly on the motor side, or, in a method which is easier to implement in many cases and provides comparatively good results, the output direct current $I_A$ is derived from at least two three-phase currents.

The quenching device can be already activated before an overcurrent can occur by variants 1 and/or 2. This protects all operating resources such as motors, fuses, thyristors, circuit breakers etc. in the best possible manner.

In the sense of an uninterruptible operation it is however necessary for no incorrect activation to occur, meaning that the quenching device is not activated without a good reason. If the variants 1 and/or 2 are designed so that they only activate the quenching device if a commutation is certainly not possible—for example by corresponding choice of parameter k in variant 1—then it is additionally also useful for a further protective device to be provided if the commutation still fails.

To this end further provision is made for the motor output direct current $I_A$ to be determined and for the quenching device to be activated if a predeterminable threshold value $I_{As}$ of the monitored output direct current is exceeded.

A typical value for this threshold value in this case is two and a half to three times the rated current of the converter bridge SRB (see FIG. 3).

Finally a number of examples of operating (error) states are provided which can be managed by the inventive quenching device.

With lightning strikes in high-voltage or medium-voltage equipment protective paths or gas-filled overvoltage protection elements are ignited. These then burn until the next current zero crossing. This produces a low-resistance power outage lasting between 3 and 20 ms. However a longer failure of the three-phase voltage can also occur in which one or more transformers or other loads hold the network at low resistance at zero.

With a short-circuit on a parallel circuit on the same network a power outage only occurs initially. The assigned fuse then melts and disconnects the faulty circuit from the network. A short overvoltage pulse then occurs in this way, in which case the duration and the strength of the outage depend on the network impedance and the error current.

Further possibilities for low-resistance power outages are all types of short circuits on the supply network.

In the examples given which all relate to low-resistance power outages and with simultaneous line equalization via the converter in the same network, the motor current immediately increases in accordance with the EMC and the armature inductance plus a network impedance until the triggering unit requests the quenching device to switch it off. The average switch-off time, i.e. the time until the motor current has fallen to zero, amounts to around 5 ms. Any overvoltage peaks when the power returns are limited as described above.

When a main circuit breaker directly in front of the converter is switched off the commutation inductances and the anchor inductance must be able to be discharged. This is achieved by the mains voltage limiting which is always active as described above. This means that there is no shoot-through, but without such an overvoltage protection there is often cross ignition. The energy reduction mainly takes place in the main circuit breaker, which however is to be avoided simply because of contact wear.

On switching off a feed transformer, e.g. at the medium-voltage level, the higher internal resistance of the network does not cause any significant current increase (on shoot-through) to occur. Specific thyristors in the converter however no longer quench and the result is a cross-igniter. This condition is likewise detected in good time and the quenching device initiates a switchover of the current. Any overvoltages occurring through demagnetization of the said transformer are in turn limited by the quenching device (diode bridge V41, . . . , V46 via V47, V48 to C3 in parallel to the voltage limiter).

The invention claimed is:

1. A method for controlling a quenching device for a converter bridge with line regeneration, comprising:
    providing a converter bridge with at least three inputs electrically connected to a three-phase network and at least two outputs electrically connected to a direct-current motor which feeds, when operated as a generator, current back into the three-phase network via the converter bridge;
    providing a network-time control circuit to control the converter bridge based upon ignition pulses of the control circuit;
    controlling the quenching device by a trigger unit which emits trigger pulses based upon a monitoring of electrical and temporary variables of a converter;
    measuring waveforms of at least two phases of the three-phase network as a function of a phase angle over a predetermined area of the phase angle;
    determining a characteristic value from the waveform of the two phases as a function of the phase angle;
    comparing the determined characteristic value to a corresponding theoretical characteristic value; and
    activating the quenching device if the characteristic value determined from the measured values of the phases deviates by a predetermined value from the theoretical characteristic value.

2. The method as claimed in claim 1, wherein the characteristic value is a area which is limited by the waveforms of the phases, with the area being calculated between a predetermined lower phase angle and a predetermined upper phase angle.

3. The method as claimed in claim 2, wherein the area is calculated based upon the formula $$A_{gem,the} = \int_{\varphi_{min}}^{\varphi_{max}} (V - U) d\varphi.$$

4. The method as claimed in claim 2, wherein a lower limit of the phase angle corresponds to a ignition angle for an ignition pulse for commutation of a first phase to a second phase.

5. The method as claimed in claim 4, wherein the upper limit corresponds to the value of the phase angle at which the first phase and the second phase have the same voltage value.

6. The method as claimed in claim 4, wherein the upper limit for the phase angle lies a maximum of 30° after the ignition angle.

7. The method as claimed in claim 2, wherein the quenching device is activated if the measured area is smaller by a specific amount than the theoretical area.

8. The method as claimed in claim 2, wherein for calculating the theoretical area for the waveforms of the phases cosine or sine wave forms are assumed for the phase angle dependency.

9. The method as claimed in claim 1, wherein a motor output direct current is determined as a function of the time, a second derivation of the output direct current is formed according to the time, and the quenching device is activated if the second derivation assumes a value equal to or greater than zero in an area between two consecutive ignition times.

10. The method as claimed in claim 1, wherein the motor output direct current is determined and the quenching device is activated if a predetermined threshold value of the monitored output direct current is exceeded.

11. The method as claimed in claim 10, wherein the threshold value corresponds to three times the rated current of the converter bridge.

12. A method for controlling a quenching device for a converter bridge with line regeneration, comprising:
    providing a converter bridge with at least three inputs electrically connected to a three-phase network and at least two outputs electrically connected to a direct-current motor which feeds, when operated as a generator, current back into the three-phase network via the converter bridge;
    providing a network-time control circuit to control the converter bridge based upon ignition pulses;
    controlling the quenching device by a trigger unit which emits trigger pulses based upon a monitoring of electrical and temporary variables;
    determining a motor output direct current as a function of time;
    forming a second derivation of the output direct current according to the time; and
    activating the quenching device if the second derivation assumes a value equal to or greater than zero in an area between two consecutive ignition times.

13. The method as claimed in claim 12, wherein the output direct current is measured directly on the motor side.

14. The method as claimed in claim 12, wherein the output direct current is derived from at least two network currents.

15. The method as claimed in claim 12, wherein the motor output direct current is determined and the quenching device is activated if a predetermined threshold value of the monitored output direct current is exceeded.

16. The method as claimed in claim 15, wherein the threshold value corresponds to three times the rated current of the converter bridge.

17. A quenching device for a converter bridge with line regeneration, comprising:
    a converter bridge with at least three electrical inputs and at least two electrical outputs;
    a network-time control circuit to control the converter bridge based upon ignition pulses;
    a trigger unit to control the quenching device, wherein the trigger unit emits trigger pulses based upon a monitoring of electrical and temporary variables and activates the quenching device if the characteristic value determined from the measured values of the phases deviates by a predetermined value from the theoretical characteristic value;

a measuring device for measuring waveform of at least two phases of a three-phase network as a function of a phase angle over a predetermined area of the phase angle;

a determining device to determine a characteristic value from the waveform of the two phases as a function of the phase angle; and a comparing device to compare the determined characteristic value to a corresponding theoretical characteristic value.

18. The quenching device as claimed in claim 17, wherein the quenching device has a quenching capacitor for a converter bridge half, a charge circuit charges the quenching capacitor to a defined quenching voltage, and switches connect the quenching capacitors to the halves of the bridge for quenching, wherein the switches are activated by the trigger unit.

* * * * *